United States Patent [19]
Tomino

[11] Patent Number: 5,437,523
[45] Date of Patent: Aug. 1, 1995

[54] HAND BURR REMOVER

[76] Inventor: Isamu Tomino, 12-27, Kitayama-choo, Hyogo-ku, Koube 652, Japan

[21] Appl. No.: 169,146

[22] Filed: Dec. 17, 1993

[51] Int. Cl.⁶ .............................................. B23B 51/10
[52] U.S. Cl. ..................................... 408/81; 408/211
[58] Field of Search ........ 408/194, 199, 211, 223–225, 408/80–83.5

[56] References Cited

U.S. PATENT DOCUMENTS

| | | | |
|---|---|---|---|
| 1,075,198 | 10/1913 | Crockett | 408/112 |
| 2,365,648 | 12/1944 | Rossmann | 408/82 |

*Primary Examiner*—Steven C. Bishop

[57] ABSTRACT

A tool for removing burrs from around both the upper and lower openings of a drilled hole 12 in a flange F comprising a collar 2, a rod-shaped main body R slidable within said collar 2 and projectable and retractable with respect to said collar 2, an upper tip 10 on the outer wall of said collar 2, the back end of said tip 10 protruding inwardly from the inner wall of said collar 2 and engaging slidably into a key flute 7 in the main body R, a lower tip 1 on the side of the lower end of the main body R and protruding laterally thereof, coiled spring 3 interposed between the the coller 2 and a washer 5 on the lower face of an adjusting nut 6 screwed at the main body R to urge the main body R into the retracted position and to maintain both the tips 1, 10 in predeterminate pressure engagement with the drilled hole 12, and a handle 4 to rotate both the main body R and the collar 2 simultaneously, whereby to enable to remove burrs from around the upper and lower openings of the drilled hole 12.

1 Claim, 3 Drawing Sheets

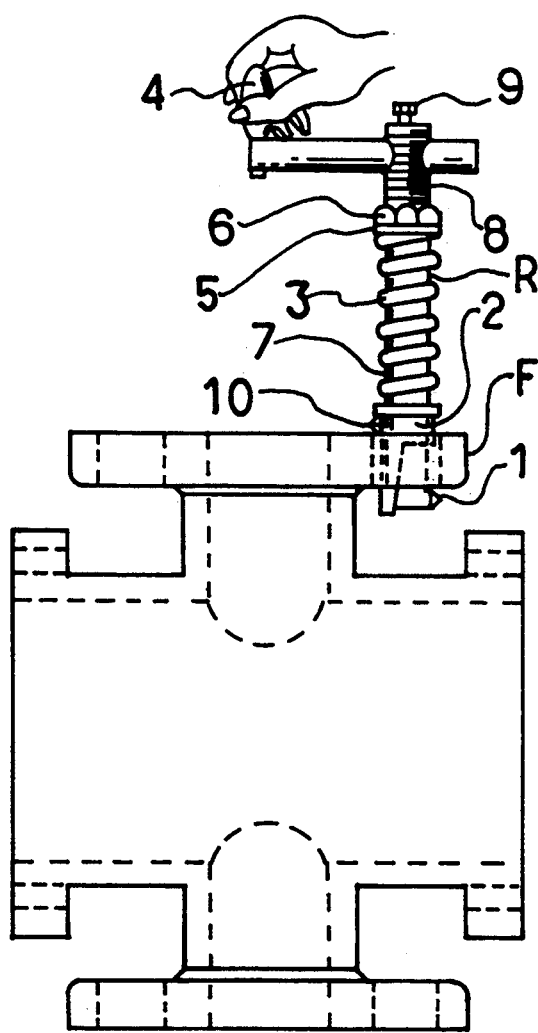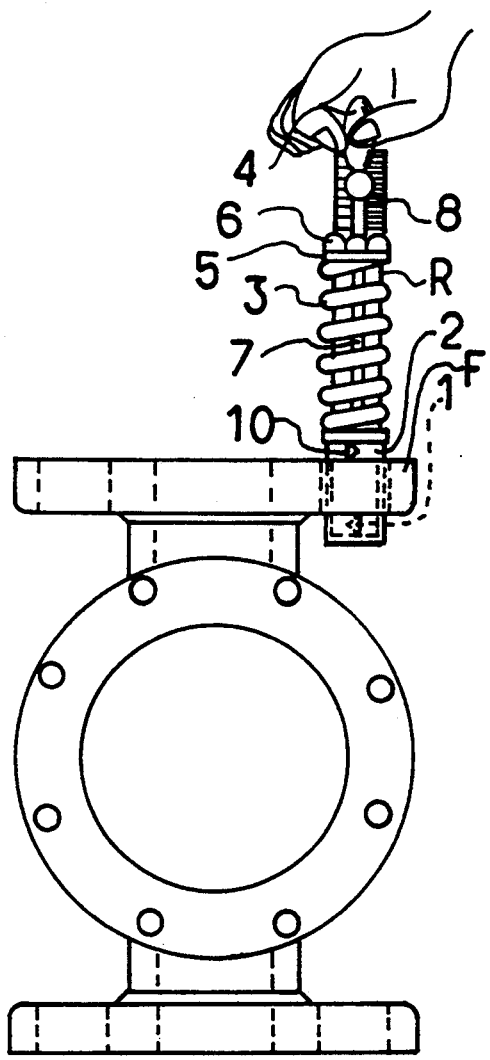

HAND BURR REMOVER

BACKGROUND OF THE INVENTION

The present invention relates to a tool for removing burrs simultaneously and easily from around both the entry and exit openings of drilled holes in flanges of valves, gear pumps, flow checkers and check valves and so on.

Up to the present time, bench drills have been used for removing burrs from the holes of the flanges. That is, with a bench drill, holes are drilled with pushing its handle down, then burrs are removed from around the exit opening of the hole with pulling its handle up. When pulling the handle up, however, the taper portion of the chuck of the bench drill sometimes comes off from the main body of the bench drill and causes trouble. It is dangerous that the exposed cutting tip remains attached to the chuck comes off. Additionally, the center of each hole to be burred needs to be set to the center of the chuck, and then the work is to be fixed in place on the working bench with using a vise. When the work is made of heavy materials, this setting process is difficult.

SUMMARY OF THE INVENTION

A tool for removing burrs from around both the upper and lower openings of a drilled hole in a flange comprising a hollow cylindrical collar fitting into said drilled hole for positioning said collar in predetermined relation thereto, a rod-shaped main body slidable within said collar and projectable and retractable with respect to said collar, an upper tip having a cutting edge on the outer wall of said collar soldered thereinto and protruding laterally thereof, in which the back end of said upper tip protruding laterally and inwardly from the inner wall of said collar and engaging slidably into a key flute carved axially in said rod-shaped main body, a lower tip having a cutting edge on the side of the lower end of said rod-shaped main body soldered thereonto and protruding laterally thereof, coiled spring held in compression interposed between the upper end of said coller and a washer on the lower face of an adjusting nut screwed at the upper part of said rod-shaped main body to normally urge said rod-shaped main body into the retracted position and to maintain both said cutting edges of the upper and lower tips in predeterminent pressure engagement with said upper and lower openings of said drilled hole, and a handle put on the end of a rod protruded laterally from the upper end of said rod-shaped main body, whereby to enable to remove burrs from around the upper and lower openings of said drilled hole by rotation of said upper and lower tips simultaneously around said drilled hole.

DESCRIPTION OF THE INVENTION

The object of the present invention is to eliminate the problem above mentioned and to provide a safe and easy tool for removing burrs from around both the upper and lower openings of a drilled hole in a flange.

The above and further objects and aspects of the invention will become more apparent from the following detailed description taken with reference to the accompanying drawings forming part of this specification, wherein:

BRIEF DESCRIPTION OF THE DRAWINGS

FIG. 1-a is a side view of the tool of the invention in operation, shown removing burrs from a flow checker after the drilling process.

FIG. 1-b is a front view of the tool in the same condition.

DESCRIPTION OF THE PREFERRED EMBODIMENT

Figure 2:
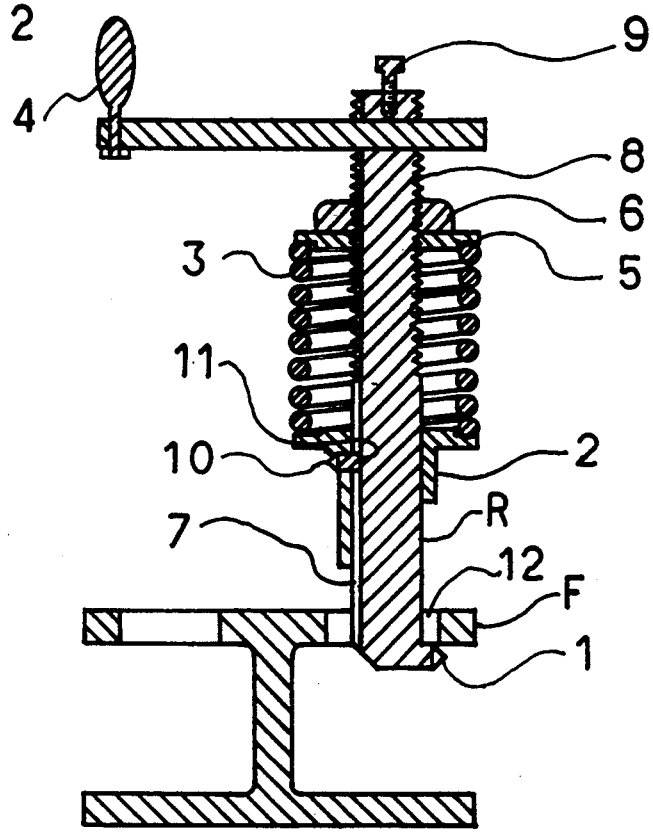
FIG. 2 is a vertical sectional view of a tool whose tip on a rod-shaped main body has attached to an exit opening to be burred of the drilled boll of the flange of a guage H steel.

Reffering particularly to the embodiment of the invention in Figures, a tool shown has a hollow cylindrical collar 2 fitting into a drilled hole 12 in the flange F of a work for positioning said collar 2 in predetermined relation to said hole 12, a rod-shaped main body R slidable within said collar 2 and projectable and retractable with respect to said collar 2. An upper tip 10 having a cutting edge has been soldered onto the outer side of said collar 2 with silver alloy at an angle of 135 degrees to the side wall of drilled hole 12 and it is protruding laterally and outwardly from said outer side. The base or the back end 11 of said upper tip 10 protrudes laterally and inwardly about 2 mm in depth from the inner side of said collar 2, and it engages slidably into a key flute 7 carved axially in said rod-shaped main body R, that prevents the independent rotation of the collar 2 from the rod-shaped main body. A lower tip 1 having a cutting edge is soldered onto the side wall of the lower end of said rod-shaped main body R with silver alloy at an angle of 135 degrees to the wall of drilled hole 12 and protrudes laterally and outwardly from said side wall. A coiled spring 3 held in compression is interposed between the upper end of said collar 2 and a washer 5 on the lower face of an adjusting nut 6 screwed at the male screw 8 on the upper part of said rod-shaped main body R in order that it may normally urge said rod-shaped main body R into the retracted position and to maintain both said cutting edges of the upper and lower tips 10, 1 in predeterminate pressure engagement with said upper and lower openings of said drilled hole 12. A rod is fixed adjustably in its lateral length on the upper end of said rod-shaped main body R with a fixing screw 9 and a handle 4 stands on the end of the rod. And whereby burrs are able to be removed from around the upper and lower openings of said drilled hole 12. Because said upper and lower tips rotate simultaneously around said drilled hole in the same torque.

Figure 3:
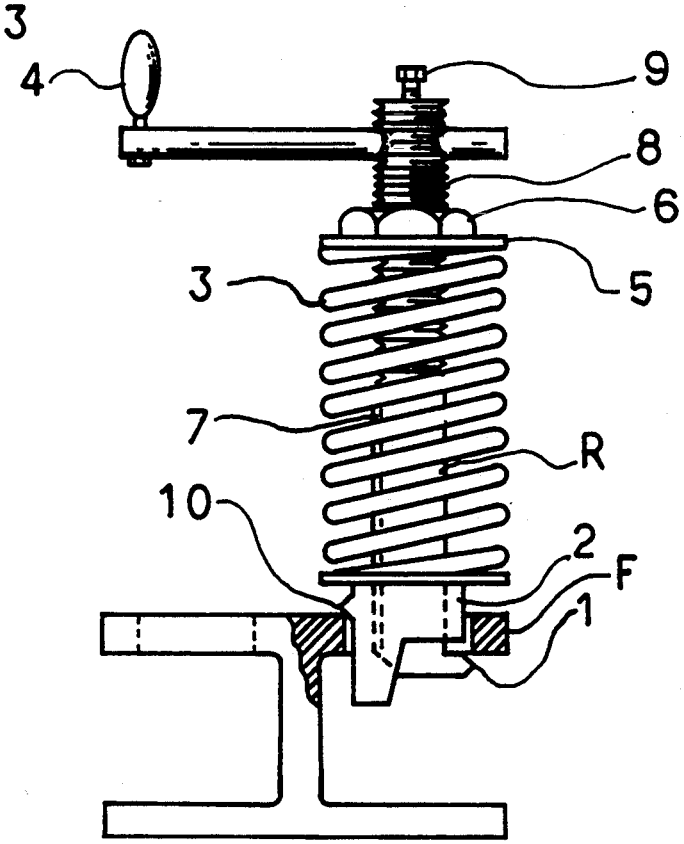
FIG. 3 is a side view of a tool embodying the principle of the invention ready to operate on the steel.
Figure 4:
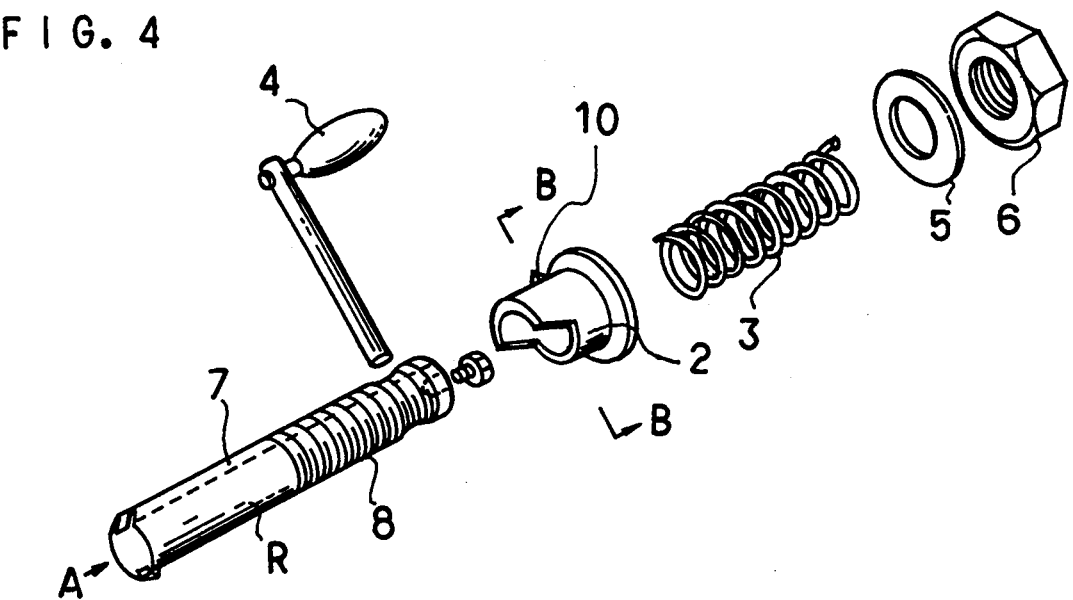
FIG. 4 shows each part of the tool of the invention disassembled.
Figure 5:
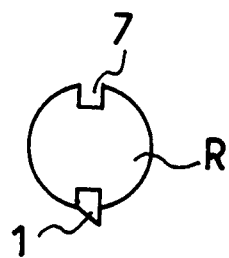
FIG. 5 is an enlarged bottom view shown from A of FIG. 4.
Figure 6:
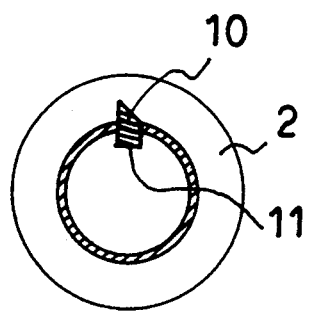
FIG. 6 is an enlarged cross-sectional view taken in the line B—B of FIG. 4.

In operation, the hollow cylindrical collar 2 is pressed towards the washer 5 or the adjusting nut 6 against the action of the coiled spring 3 with pressing the upper end of the tool by the palm of one hand and with pulling up the undersurface of the collar 2 by the index and the middle fingers of the other hand. Then the lower end of the rod-shaped main body is inserted into the hole with its axis slightly shifting to the opposite direction against the tip 1 and it readily passes through the drilled hole 12 in the flange F of a guage H steel, as shown in FIG. 2. The insertion is complete when the hollow cylindrical collar 2 is seated and in the hole 12 after a slight lateral movement of the main body R, as shown in FIG. 3. The tool is seated securely and the burring operation may be begun by rotating the tool from 2 to 4 times by gripping the handle 4, as shown in FIG. 1-a and FIG. 1-b, in this case the work to be burred is a flow checker. Assuming that the flow checker is a 4BJ1810K flange model, it has eight bolt holes of which diameter is 19 mm. And then the outside diameter of the collar 2 is 18.5 mm. The burrs will be removed from arround the upper and lower openings of the drilled hole 12 simulteneously with rotating the cutting edges of the lower and upper tips 1, 10 in the same torque. The operation of the tool in the invention is safe and easy.

Flange valves, flow checkers, and nonreturn valves are made of different materials depending on the kind of fluid carried therewithin. For instance, BC is used for to carry water, SUS is used for pure water, and for oil FC is used. Then the resultant burrs after drillling differ in roughness and hardness as the materials of the work differ. In this invention, two types of the coiled springs which differ in diameter and in strength may be prepared and may be interposed together between the coller 2 and the washer 5. For instance, a stronger spring may be set at the outside of a weaker one. A stronger spring and a weaker spring may be employed together to remove harder burrs like SUS's, but a weaker spring for soft burrs like BC's and a stronger spring for medium-hard burrs like FC's independently. Chosen three variation, in such a way above mentioned, the scope of application of the tool become wider. Thus the efficiency of the hand burrs remover of the invention is greatly increased.

What is claimed is:

1. A tool for removing burrs from around both upper and lower openings of a drilled hole in a flange, comprising a hollow cylindrical collar fitting into said drilled hole for positioning said collar in predetermined relation thereto, a rod-shaped main body slidable within said collar and projectable and retractable with respect to said collar, an upper tip having a cutting edge on an outer wall of said collar soldered thereonto and protruding laterally thereof, in which a back end of said upper tip protrudes laterally and inwardly from an inner wall of said collar and engages slidably into a key flute carved axially in said rod-shaped main body, a lower tip having a cutting edge on a side of a lower end of said rod-shaped main body soldered thereonto and protruding laterally thereof, a coiled spring held in compression interposed between an upper end of said collar, and a washer on a lower face of an adjusting nut screwed at an upper part of said rod-shaped main body to normally urge said rod-shaped main body into a retracted position and to maintain both said cutting edges of the upper and lower tips in predeterminate pressure engagement with said upper and lower openings of said drilled hole, and a handle put on an end of a rod protruding from the upper part of said rod-shaped main body, whereby to enable to remove burrs from around the upper and lower openings of said drilled hole by rotation of said upper and lower tips simultaneously around said drilled hole.

* * * * *